United States Patent [19]

Smutny

[11] Patent Number: 4,859,729

[45] Date of Patent: Aug. 22, 1989

[54] PLASTICIZED COMPOSITION AND METHOD OF PRODUCTION

[75] Inventor: Edgar J. Smutny, Houston, Tex.

[73] Assignee: Shell Oil Company, Houston, Tex.

[21] Appl. No.: 240,653

[22] Filed: Sep. 6, 1988

Related U.S. Application Data

[62] Division of Ser. No. 99,857, Sep. 22, 1987, Pat. No. 4,795,773.

[51] Int. Cl.$^4$ .................................................. C08K 5/41
[52] U.S. Cl. ...................................... 524/170; 524/167; 524/361; 524/380; 524/385; 524/612
[58] Field of Search ............... 524/167, 170, 612, 361, 524/380, 385

[56] References Cited

U.S. PATENT DOCUMENTS

| | | | |
|---|---|---|---|
| 2,495,286 | 1/1950 | Brubaker | 528/392 |
| 3,694,412 | 9/1972 | Nozaki | 528/392 |
| 3,984,388 | 10/1976 | Shryne et al. | 528/392 |
| 4,024,325 | 5/1977 | Hudgin | 528/392 |
| 4,024,326 | 5/1977 | Hudgin | 528/392 |
| 4,076,911 | 2/1978 | Fenton | 528/392 |
| 4,192,942 | 3/1980 | Mainord | 528/392 |

FOREIGN PATENT DOCUMENTS

| | | |
|---|---|---|
| 0121965 | 8/1984 | European Pat. Off. |
| 0181014 | 5/1986 | European Pat. Off. |
| 0213671 | 3/1987 | European Pat. Off. |
| 1081304 | 3/1965 | United Kingdom |

Primary Examiner—Joseph L. Schofer
Assistant Examiner—J. M. Reddick
Attorney, Agent, or Firm—Dean F. Vance

[57] ABSTRACT

Plasticized compositions are produced by intimately mixing (a) a linear alternating polymer of carbon monoxide and at least one ethylenically unsaturated hydrocarbon and (b) an organic sulfone. Particularly preferred compositions comprise polymers of carbon monoxide and ethylene or polymers of carbon monoxide, ethylene and propylene, plasticized by the intimate presence therein of sulfolane.

9 Claims, No Drawings

PLASTICIZED COMPOSITION AND METHOD OF PRODUCTION

This is a division of application Ser. No. 099,857 filed Sept. 22, 1987, now U.S. Pat. No. 4,795,773.

This invention relates to the class of linear alternating polymers of carbon monoxide and at least one ethylenically unsaturated hydrocarbon and particularly to novel plasticized compositions of the polymers. Additionally, the invention relates to a method for the production of the novel compositions.

The class of polymers of carbon monoxide and olefin(s), often referred to as polyketones, has been known for a number of years. Brubaker, U.S. Pat. No. 2,495,286 produced such polymers in the presence of free radical initiators such as benzoyl peroxide. British Published Patent Specification No. 1,081,304 produced such polymers in the presence of alkylphosphine complexes of palladium salts as catalysts. Nozaki, U.S. Pat. No. 3,694,412, extended the process through the use of arylphosphine complexes of palladium salts and certain inert solvents.

Particularly useful copolymers and terpolymers of carbon monoxide with at least one ethylenically unsaturated compound, e.g., ethylene or ethylene and propylene, have been shown to be linear alternating polymers of the formula —CO(A)— where A is the moiety obtained by polymerization of the ethylenically unsaturated hydrocarbon through the ethylenic unsaturation. For example, copolymers of carbon monoxide and ethylene are of the formula —CO(CH$_2$CH$_2$)—. The general process for the production of the linear alternating polymers is illustrated by published European Patent Application Nos.181,014 and 121,965. The process generally involves the use of a catalyst formed from a Group VIII metal compound wherein the metal is palladium, cobalt or nickel, the anion of a non-hydrohalogenic acid having a pKa below 2 and a bidentate ligand of phosphorus, arsenic or antimony. The resulting polymers are generally high molecular weight thermoplastic polymers having utility in the production of structural articles such as containers for food and drink and parts for the automobile industry. The relatively high melting point of the polyketone polymers is of value in many applications, e.g., where a resulting shaped article is to be subjected to conditions of elevated temperature. For other applications, however, high temperature stability is not required and it would be of value to provide plasticized compositions of polyketone polymers with reduced melting temperatures.

SUMMARY OF THE INVENTION

The present invention relates to plasticized compositions comprising linear alternating copolymers or terpolymers of carbon monoxide with one or more ethylenically unsaturated hydrocarbons, which compositions incorporate a quantity of a sulfone sufficient to plasticize the polyketone polymer. In addition, the invention relates to a method of producing the plasticized compositions.

DESCRIPTION OF THE INVENTION

The polymers which are plasticized according to the process of the invention are linear alternating polymers of carbon monoxide and at least one ethylenically unsaturated hydrocraben. Suitable ethylenically unsaturated hydrocarbons have from 2 to 20 carbon atoms inclusive, preferably from 20 to 10 carbon atoms inclusive, and are aliphatic such as ethylene and other α-olefins including propylene, butene-1, octene-1 and dodecene-1 or are arylaliphatic containing an aryl substituent in an otherwise aliphatic molecule, particularly an aryl substituent on a carbon atom of the ethylenic unsaturation. Illustrative of this latter class of olefins are styrene, p-methylstyrene, p-ethylstyrene and m-methylstyrene. Preferred polyketone polymers are copolymers of carbon monoxide and ethylene or terpolymers or carbon monoxide, ethylene and a second a-olefin, particularly propylene.

Of particular interest are those polymers of molecular weight from about 1,000 to about 200,000, particularly those of molecular weight from about 10,000 to about 50,000, and containing substantially equimolar quantities of carbon monixide and hydrocarbon.

Such polymers are produced by contacting carbon monoxide and the ethylenically unsaturated hydrocarbon(s) under polymerization conditions in the presence of a catalytic amount of a catalyst formed from a compound of the Group VIII metals palladium, cobalt or nickel, an anion of a nonhydrohalogenic acid of a pKa less than about 6, preferably less than about 2, and a bidentate ligand of phosphorus, arsenic or anitomy. Although the scope of the polymerization process is extensive, for purposes of illustration the preferred Group VIII metal compound is palladium acetate, the anion is the anion of an acid selected from trifluoracetic acid and p-toluenesulfonic acid and the bidentate ligand is 1,3-bis(diphenylphosphino)propane.

Polymerization is carried out at elevated temperature and pressure and in the gaseous phase or in the liquid phase in the presence of a liquid diluent, e.g., methanol or ethanol. The reactants are contacted by conventional methods such as shaking or stirring and subsequent to reaction the polymer product is recovered as by filtration or decantation. The polymer product may contain metal residues from the catalyst which are removed if desired by contact with a solvent selective for the residues. Production of this class of polymers is illustrated, for example, by Published European Patent Application Nos. 181,014 and 121,965.

The physical properties of the polymer will be determined in part by molecular weight and whether the polymer is a copolymer or a terpolymer. Typical melting points are from about 175° C. to about 300° C., more frequently from abut 210° C. to about 260° C. The structure of the polymers is that of a regular alternating copolymer of carbon monoxide, ethylene and any second ethylenically unsaturated hydrocarbon and the polymer will contain substantially one carbon monoxide moiety for each moiety of unsaturated hydrocarbon. When terpolymers of carbon monoxide, ethylene and a second hydrocarbon i.e. a hydrocarbon of at least 3 carbon atoms, are produced there will be at least about 2 units incorporating moieties of ethylene per unit incorporating a moiety of the second unsaturated hydrocarbon, preferably from about 10 to about 100 units incorporating moieties of ethylene per unit incorporating a unit of the second unsaturated hydrocarbon. The polymer chain of the preferred class of polymer products is thus illustratd by the formula $$-CO(CH_2-CH_2)]_x[CO(B)]_y-$$

wherein B is the moiety obtained by polymerization through the ethylenic unsaturation of the second ethylenically unsaturated hydrocarbon. The —CO(C-

H$_2$—CH$_2$)— units and the —CO(B)— units are found randomly throughout the polymer chain and the ratio of y:x is no more than about 0.5:1. In the modification of the invention which employs copolymers of carbon monoxide and ethylene without units of a second ethylenically unsaturated hydrocarbon, the polymers are represented by the above formula wherein y=0. When y is other than 0, ratios of y:x from about 0.01 to about 0.1 are preferred.

The plasticized compositions of the invention comprise the above polymers having intimately mixed therewith a plasticizing quantity of a sulfone. Illustrative of sulfones useful as plasticizes in the present invention is the class of organic compounds of from 2 to 20 carbon atoms inclusive, particularly those of from 2 to 15 carbon atoms inclusive, characterized by the inclusion within the molecule of a —SO$_2$— sulfone linkage. The substituents of the sulfone linkage are hydrocarbyl or are substituted hydrocarbyl wherein the substituents are non-reactive toward the components of the plasticized composition. The substituents are aliphatic or aromatic and are monovalent or are such that the substituents taken together with the sulfone linkage form a heterocyclic ring containing only carbon atoms besides the sulfur of the sulfone linkage. A preferred class of such sulfones is represented by the formula

R—SO$_2$—R wherein R independently is alkyl including arylalkyl, aryl including alkaryl, or such that both R groups taken together with the —SO$_2$— linkage form a heterocyclic ring of from 4 to 8 carbon atoms in the ring. Illustrative of alkyl groups are hydrocarbyl groups such as methyl, ethyl, i-butyl, benzyl and octyl and substituted hydrocarbyl alkyl groups such as 3-methoxypropyl, 3-(N,N-dimethylamino)octyl and 4-hydroxybutyl. Suitable aryl substituents are hydrocarbyl groups such as phenyl, 2-ethylphenyl, 2,4-dimethylphenyl and naphthyl and substituted hydrocarbyl aryl groups such as 4-methoxyphenyl, 3-bromophenyl and 2-methyl-4-chlorophenyl. Heterocyclic sulfones useful as plasticizer include hydrocarbyl sulfones such as tetramethylene sulfone (sulfolane), 2-methyltetramethylene sulfone, 3,4-dimethyltetramethylene sulfone, trimethylene sulfone, hexamethylene sulfone and octamethylene sulfone. Substituted hydrocarbyl heterocyclic sulfones are illustrated by 2-chlorotetramethylene sulfone, and 2,3-dihydroxytetramethylene sulfone. In general, the hydrocarbyl sulfones are preferred over the substituted hydrocarbyl sulfones and best results are typically obtained with a hydrocarbyl heterocyclic sulfone. Particularly preferred is tetramethylene sulfone, i.e., sulfolane.

The plasticized polymer compositions are obtained by intimately mixing the sulfone throughout the polyketone polymer. The amount of sulfone can be varied, and the properties of the resulting composition will depend in part upon the proportion of sulfone it contains. Too little sulfone will result in very little melting point lowering and the objectives of incorporating a plasticizer may not be realized. On the other hand, too large an amount of plasticizer will result in a partial loss of the desirable mechanical properties of the polyketone polymer. Amounts of sulfone from about 5% by mol up to about 50% by mol, based on total composition are useful with amounts from about 10% to about 25% by mol on the same basis being preferred.

The plasticized compositions of the invention may also contain other conventional polymer additives which are inert to the polymer and sulfone plasticizer such as blowing agents, mold release agents and antioxidants which may be added by blending, omitting or other conventional methods.

The method of producing the plasticized composition is of considerable importance since many of the more conventional methods of producing plasticized compositions are not effective for the sulfone-stabilized compositions of the invention. To obtain an effectively plasticized composition, the polyketone polymer and the sulfone must be intimately mixed. The preferred method of providing this degree of mixing is through a certain type of coprecipitation of the polymer and sulfone. The polymer is dissolved in a solvent for the polymer such as hexafluoroisopropanol, m-cresol or o-chlorophenol. The polymer solution is then contacted with an excess of a solution of the sulfone in a material which is a solvent for the sulfone but a non-solvent for the polymer. Such selective solvents include water, acetone and lower alcohols such as methanol and ethanol. The concentration of the polymer solution and of the sulfone solution is not critical and in both cases concentrations of solute, i.e., polymer or sulfone, from about 0.1% by weight to about 15% by weight, based on total solution, are suitable with the upper limit of concentration being limited by the solubility of the particular polymer or sulfone in the particular solvent. Largely because of solubility considerations, concentrations of polymer or sulfone from about 0.5% to about 10% by weight are preferred.

Production of the plasticized compositions is brought about by rapid contact, as by mixing, of the polymer solution and the sulfone solution. The precipitated polymer-sulfone composition is recovered by conventional methods such as filtration or decantation and is used as such or is mixed with other additives.

The plasticized polymer compositions are characterized by lower melting points or initial softening points than the polyketone polymers from which they are prepared, as well as by increased tensile strength and impact resistance. As such, the compositions are useful in thermoplastic applications not requiring treatment at high temperature but in which greater ease of processing is desired.

The invention is further illustrated but not limited by the following Comparative Experiment (not of the invention) and the following Illustrative Embodiments.

COMPARATIVE EXAMPLE I

A linear alternating copolymer of carbon monoxide and ethylene was prepared by polymerization of an equimolar mixture carbon monoxide and ethylene by conventional techniques in the presence of a catalyst formed from palladium acetate, the anion of trifluoroacetic acid and 1,3-bis(diphenylphosphino) propane. The polymer was characterized by an initial melting point of 257° C.

(a) Samples of this polymer, 1 g, were dissolved with heating in 50 ml of hexafluoroisoropyl alcohol (HFIPA) and then added to a large excess of water. The polymer which came out of solution was recovered by filtration and dried in vacuo. The initial melting point of the polymer products were raised by as much as 20° C. when compared to that of the original polymer.

(b) A 1 gram sample of the polymer was dissolved with heating in 250 ml of HFIPA and 0.5 g of sulfolane was added to the resulting solution. This mixture was then added to an excess of water and the polymer product which came out of solution was collected by filtration and dried in vacuo. A total of 0.95 g of polymer was recovered. The polymer had an initial melting point of 267° C. and, according to NMR analysis, contained no sulfolane.

ILLUSTRATIVE EMBODIMENT I (a) A 1 g sample of the polymer of Comparative Example I was dissolved in 250 ml of HFIPA and then added to an excess of 5% sulfolane in water. A polymer product, 2.0 g, was recovered which, upon drying was found by NMR analysis to contain 35% by mol sulfolane. The initial melting point was 218° C.

(b) The procedure of part a) was repeated except that solution of 10% sulfolane in water was employed. The recovered polymer composition, 1.7 g, was shown by NMR analysis to contain 26% by mol sulfolane. The initial melting point was 226° C.

(c) The procedure of part (a) was repeated except that a 1:3 (by volume) mixture of sulfolane and water was used. After separation and drying, the polymer composition, 2.6 g, was recovered and shown by NMR analysis to contain 48% by wt sulfolane. The initial melting point was 201° C.

ILLUSTRATIVE EMBODIMENT II

A 5 g sample of the polymer of Comparative Example I was dissolved, with heating, in 250 ml of HFIPA. On cooling, the solution was added to an excess of a solution of 5% by weight of diphenylsulfone in acetone. The polymer composition thereby formed, 1.5 g after recovery and drying in vacuo was shown by NMR to contain 10% by mol of diphenyl sulfone. The initial melting point was 233° C.

ILLUSTRATIVE EMBODIMENT III

Similar melting point lowerings are observed when m-cresol solutions of carbon monoxide/ethylene/propylene terpolymer are added to an excess of sulfolane in water. The resulting polymer composition, which will contain sulfolane, will have an initial melting point lower than that of the terpolymer.

What is claimed is:

1. A process for the production of a plasticized composition which comprises intimately mixing
   (a) a linear alternating polymer of carbon monoxide and at least one ethylenically unsaturated hydrocarbon of from 2 to 20 carbon atoms inclusive, and
   (b) organic sulfone of from 2 to 20 carbon atoms inclusive wherein the substituents of the —$SO_2$— linkage of said sulfone are of 2 to 20 carbon atoms inclusive and are hydrocarbyl or substituted hydrocarbyl in which the substituents are non-reactive toward the components of the plasticized composition.

2. The process of claim 1 wherein said mixing comprises the intimate mixing of a solution of said polymer in a solvent therefor and a solution of said sulfone in a solvent for said sulfone by a non-solvent for said polymer, and recovering the resulting plasticized polymer composition.

3. The process of claim 2 wherein the polymer is of the formula

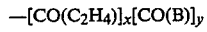

wherein B is a moiety of an ethylenically unsaturated hydrocarbon polymerized through the ethylenic unsaturation and the ratio of y:x is no more than about 0.5:1.

4. The process of claim 3 wherein the sulfone is represented by the formula R—$SO_2$—R wherein R independently is alkyl, aryl or such that the R substituents together with the sulfone linkage form a heterocyclic ring containing only carbon atoms besides the sulfur of the sulfone linkage.

5. The process of claim 4 wherein B is a moiety of propylene.

6. The process of claim 4 wherein y=0.

7. The process of claim 6 wherein the solvent for the polymer is hexafluoroisopropyl alcohol or m-cresol and the solvent for the sulfone but non-solvent for the polymer is acetone or water.

8. The process of claim 7 wherein the sulfone is sulfolane.

9. The process of claim 7 wherein the sulfone is diphenyl sulfone.

* * * * *